(12) United States Patent
Siegfried

(10) Patent No.: US 7,549,827 B2
(45) Date of Patent: Jun. 23, 2009

(54) HOLE PLACEMENT GUIDE

(76) Inventor: Harry Siegfried, 1001A E. Harmony, Fort Collins, CO (US) 80525

( * ) Notice: Subject to any disclaimer, the term of this patent is extended or adjusted under 35 U.S.C. 154(b) by 359 days.

(21) Appl. No.: 11/619,261

(22) Filed: Jan. 3, 2007

(65) Prior Publication Data

US 2008/0159821 A1 Jul. 3, 2008

(51) Int. Cl.
*B23B 47/28* (2006.01)
(52) U.S. Cl. .................. 408/115 R; 33/638; 33/562
(58) Field of Classification Search ........... 408/72 R, 408/72 B, 97, 115 R, 115 B, 241 B; 33/638, 33/666, 678, 679, 562, 566, 26; *B23B 47/28*
See application file for complete search history.

(56) References Cited

U.S. PATENT DOCUMENTS

| | | | | | |
|---|---|---|---|---|---|
| 1,258,137 | A | * | 3/1918 | Neth | 408/115 R |
| 1,601,645 | A | * | 9/1926 | Ratcliffe | 33/534 |
| 1,927,992 | A | * | 9/1933 | Pulver | 33/679 |
| 2,232,374 | A | * | 2/1941 | Drews | 408/115 R |
| 2,373,918 | A | * | 4/1945 | Schoeniger | 408/104 |
| 2,619,730 | A | * | 12/1952 | Clarence | 33/666 |
| 2,934,979 | A | * | 5/1960 | Hartje | 408/103 |
| 3,073,188 | A | * | 1/1963 | May | 408/115 R |
| 3,204,493 | A | * | 9/1965 | Severdia | 408/97 |
| 3,257,896 | A | * | 6/1966 | Mills, Sr. | 356/138 |
| 4,093,394 | A | * | 6/1978 | Adams | 408/103 |
| 5,033,179 | A | * | 7/1991 | Specktor | 29/402.01 |
| 7,189,034 | B1 | * | 3/2007 | Zeilinger et al. | 408/1 R |

* cited by examiner

*Primary Examiner*—Daniel W Howell
(74) *Attorney, Agent, or Firm*—Samuel M. Freund; Cochran Freund & Young LLC

(57) ABSTRACT

A hole placement guide adapted for marking and/or drilling hole locations at chosen positions in workpieces, and an elongated extension member for attaching to the hole placement guide in numerous positions, such that hole positions interior to the workpiece surface which cannot otherwise be accessed by the present hole placement guide can be marked and/or drilled, are described. The guide includes a marker and/or drill bit guide adapted to slide in a rotatable slot which permits all locations within a circle defined by the rotatable slot to be marked and/or drilled. In use, the present hole placement guide may be positioned at the corner of a drawer or door and the marker and/or drill guide adjusted in the slot to a desired hole position to be marked and/or drilled. The chosen location may then be transferred to other drawers and doors, as examples of workpieces, by positioning the hole placement guide at the same corner of another drawer or door. In the event that the desired location cannot be accessed by the marker and/or drill guide, the elongated extension member may be reversibly secured at numerous locations on the hole location guide, and a second slidable marker and/or drill guide adapted to be moved along the extension may be moved to the chosen location.

7 Claims, 5 Drawing Sheets

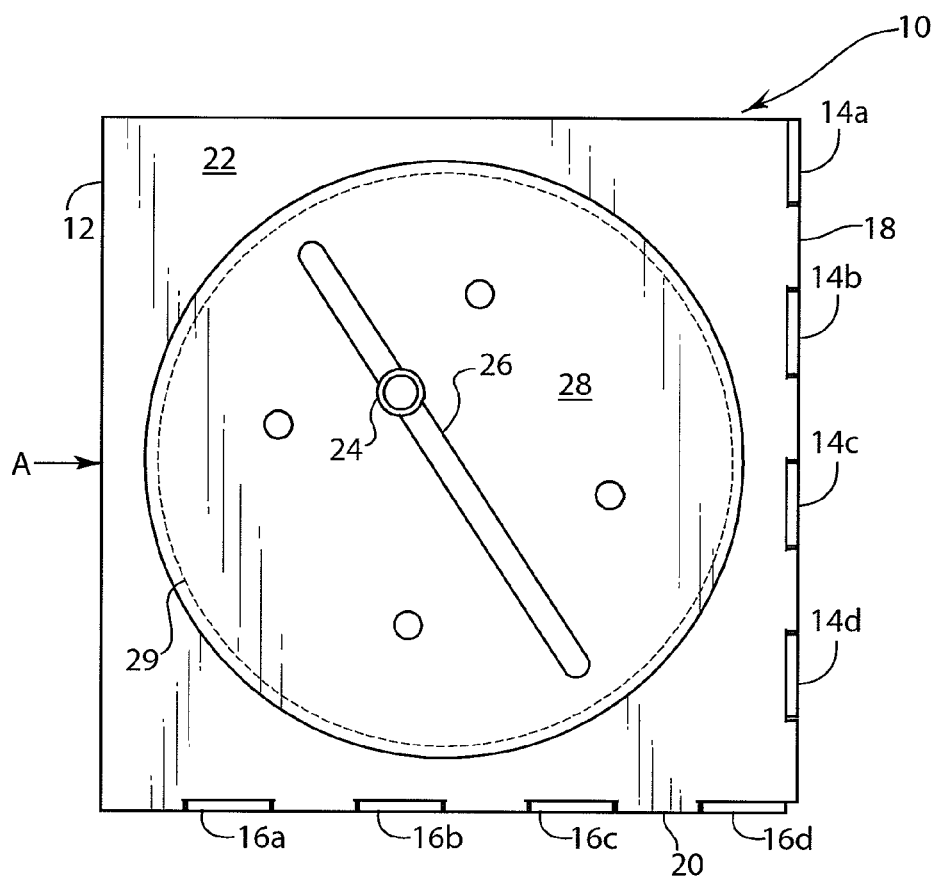
FIG. 1A
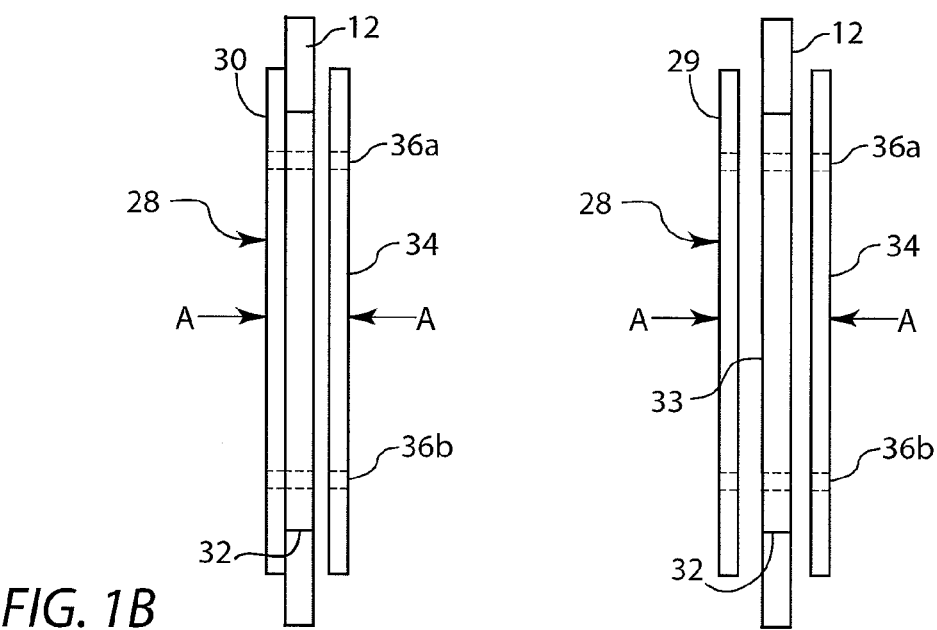
FIG. 1B
FIG. 1C

HOLE PLACEMENT GUIDE

FIELD OF THE INVENTION

The present invention relates generally to the location of holes in a workpiece and, more particularly, to apparatus for marking and drilling hole positions in a chosen location in multiple workpieces.

BACKGROUND OF THE INVENTION

Typically, household and industrial cabinets are supplied without holes for door knobs and handles or pulls. Installers are faced with accurately marking and drilling hole positions for these fixtures in multiple cabinet doors and drawers.

In U.S. Pat. No. 4,684,299 for "Liberty Jig" which issued to Roger J. Laliberte on Aug. 4, 1987, a device useful for locating and drilling hole positions in cabinet doors and drawers is described. An L-shaped member is placed at a corner of the workpiece, and an adjustable, slidable member having guides for accommodating drill bits permits adjustment along perpendicular axes. The device of the '299 patent has many parts, and cannot readily be expanded to reach portions of doors and drawers away from the corner.

Accordingly, it is an object of the present invention to provide an apparatus for marking and/or drilling hole positions at chosen locations in multiple workpieces.

Another object of the present invention is to provide an apparatus for marking and/or drilling hole positions at chosen locations in workpieces which render accessible hole positions away from the corners of the workpieces.

Yet another object of the invention is to provide an apparatus for marking and/or drilling hole positions at chosen locations in cabinet drawers and doors.

Still another object of the present invention is to provide an apparatus for marking and/or drilling pairs of holes along the line between the holes having a horizontal or a vertical orientation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the apparatus for marking and/or drilling hole locations in doors and drawers, includes in combination: a planar guide member having two sides bounded in part by two adjacent straight edges forming a right angle at their meeting point and capable of engaging a corner of the door or drawer, the guide member having a circular hole therethrough having a chosen diameter; a circular insert adapted to be rotatably disposed in the hole in the guide, having a first circular end plate integrally formed therewith having a diameter larger than the circular hole in the guide, and having a first slot therethrough disposed along a diameter thereof; a second circular end plate having a diameter larger than the circular hole in the guide, and having a second slot therethrough disposed along a diameter thereof; means for securing the circular insert to the second circular end plate such that the first end plate of the circular insert is disposed on one side of the guide member and the second end plate is disposed on the other side thereof forming thereby a rotatable member, the first slot is aligned with the second slot forming a combined slot, and the rotatable member can be rotated; and a first drill guide having a hole therethrough effective for accommodating a drill bit having a first selected diameter, and adapted to slidably move in the combined slot.

In another aspect of the present invention, and in accordance with its objects and purposes, the apparatus for marking and/or drilling hole locations in doors and drawers, hereof, includes in combination: a planar guide member having two sides bounded in part by two adjacent straight edges forming a right angle at their meeting point and capable of engaging a corner of the door or drawer, the guide member having a circular hole therethrough having a chosen diameter; a circular insert adapted to be rotatably disposed in the hole in the guide and having a first slot therethrough along a diameter thereof; a first circular end plate having a diameter larger than the circular hole in the guide, and having a second slot therethrough disposed along a diameter thereof; a second circular end plate having a diameter larger than the circular hole in the guide, and having a third slot therethrough disposed along a diameter thereof; means for securing the circular insert to the first circular end plate and to the second circular end plate such that the first end plate is disposed on one side of the guide member and the second end plate is disposed on the other side thereof forming thereby a rotatable member, the first slot is aligned with the second slot and the second slot is aligned with the third slot forming thereby a combined slot, and the rotatable member can be rotated; and a first drill guide having a hole therethrough effective for accommodating a drill bit having a selected diameter, and adapted to slidably move in the combined slot.

In still another aspect of the present invention in accordance with its objects and purposes, the apparatus for marking and/or drilling hole locations in doors and drawers, hereof, includes in combination: a planar guide member having two sides bounded in part by two adjacent straight edges forming a right angle at their meeting point, and a plurality of tabs along the two adjacent straight edges alternatively directed perpendicularly to each side of the planar guide member, whereby the planar guide member is capable of reproducibly engaging a corner of a drawer or door, the guide member further having a circular hole therethrough having a chosen diameter; a circular insert adapted to be rotatably disposed in the hole in the guide and having a first slot therethrough along a diameter thereof; a first circular end plate having a diameter larger than the circular hole in the guide, and having a second slot therethrough disposed along a diameter thereof; a second circular end plate having a diameter larger than the circular hole in the guide, and having a third slot therethrough disposed along a diameter thereof; means for securing the circular insert to the first circular end plate and to the second circular end plate such that the first end plate is disposed on one side of the guide member, the second end plate is disposed on the other side thereof forming thereby a rotatable member, the first slot is aligned with the second slot and the second slot is aligned with the third slot forming thereby a combined slot, and the rotatable member can be rotated; a first drill guide having a hole therethrough effective for accommodating a drill bit having a first selected diameter, and adapted to slidably move in the combined slot; and an extension member having an elongated portion onto which at least one slide bearing a second drill guide having a hole therethrough effective for accommodating a drill bit having a second selected diameter is movably located, and a second slide bearing a post adapted to be received by the first drill guide and adapted to be movably located on the elongated portion of the extension member, the extension member being adapted to be adjustably attached to the guide member using a portion of the plurality of tabs, the first drill guide and the second slide, and disposed perpendicular to either of the adjacent straight edges, the elongated portion extending beyond the planar sides of the guide member.

Benefits and advantages of the present invention include, but are not limited to, a hole position marking and/or drilling apparatus having few parts, and adaptable for reaching a significant portion of the area of a drawer or door for repeatedly marking and/or drilling holes in identical locations in different drawers or doors.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a planar view of an embodiment of the hole placement guide of the present invention, illustrating alignment tabs on two straight edges thereof which meet at a right angle, and a marker and/or drill bit guide adapted to slide in a slot in a rotatable member; FIG. 1B is a schematic representation of the guide shown in FIG. 1A hereof illustrating a side view of a rotatable member hereof where the circular insert is integral with one end plate is disposed on one side of the guide, the other end plate being disposed on the other side thereof; FIG. 1C is a schematic representation of the guide shown in FIG. 1A hereof illustrating a side view of a rotatable member hereof where the circular insert is flanked by one end plate disposed on one side of the guide, with the other end plate being disposed on the other side thereof.

DETAILED DESCRIPTION OF THE INVENTION

Figure 1D:
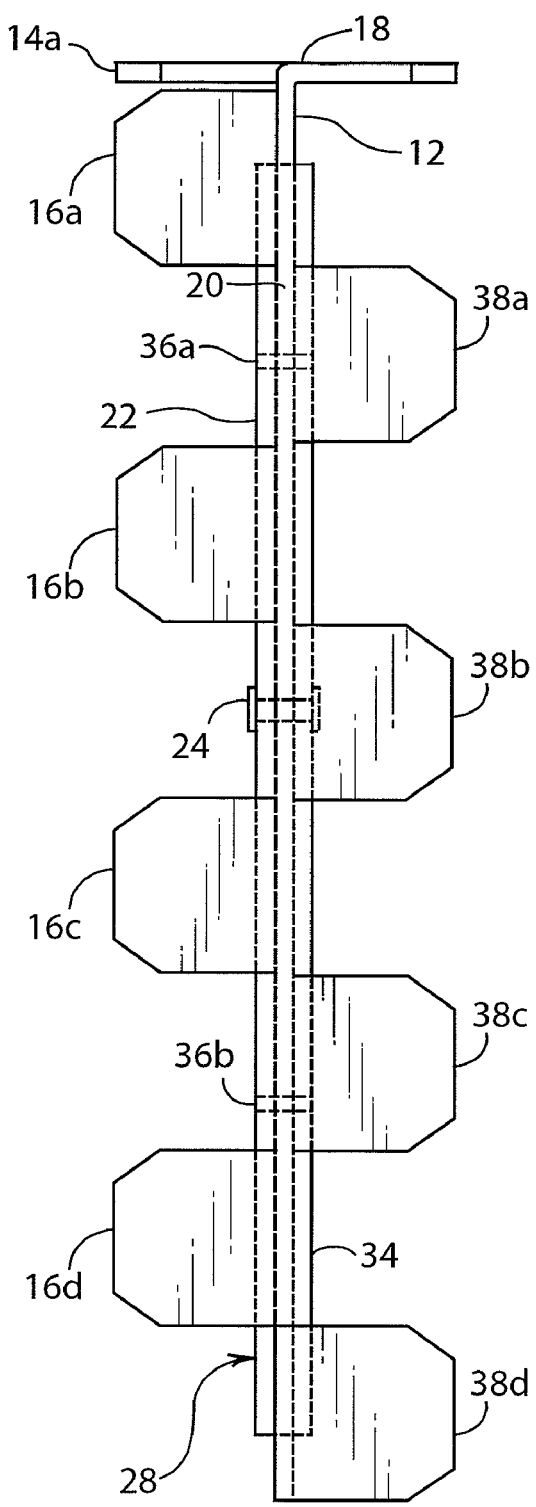
FIG. 1D is a schematic representation of an end view of one edge of the hole placement guide shown in FIG. 1A hereof, showing the alignment tabs thereof.

Briefly, the present invention includes a hole placement guide suitable for locating and drilling hole positions at chosen positions in workpieces, and an elongated extension member suitable for attaching to the hole placement guide in numerous positions, such that hole positions interior to the workpiece surface which cannot otherwise be accessed by the present hole placement guide can be marked and/or drilled. The guide includes a marker and/or drill bit guide adapted to slide in a rotatable slot which permits all locations within a circle defined by the rotatable slot to be marked and/or drilled. In use, the present hole placement guide may be positioned at the corner of a drawer or door and the marker and/or drill guide adjusted in the slot to a desired hole location to be marked and/or drilled. The rotatable feature of the slot permits potential hole locations to be continuously accessed. The chosen location may then be transferred to other drawers and doors, as examples of workpieces, by positioning the hole placement guide hereof at the same corner of another drawer or door. In the event that the desired location cannot be accessed by the marker and/or drill guide, the elongated extension member may be secured at numerous locations by use of the drill guide and tabs of the hole location guide which is then reproducibly located at a corner of the workpiece, and a slidable marker and/or drill guide adapted to be moved along the extension member is adjusted until the desired location to be marked and/or drilled is reached.

Reference will now be made in detail to the present preferred embodiments of the inventions, examples of which are illustrated in the accompanying drawings. In the Figures, similar or identical structure will be identified using identical callouts. Turning now to FIG. 1, a schematic representation of a top planar view of an embodiment of hole placement guide, 10, of the present invention is shown. Planar guide member, 12, has workpiece alignment tabs, 14a-d, and 16a-d, disposed on two straight edges, 18, and 20, thereof which meet at a right angle, the tabs being shown as being perpendicular to face, 22. First marker and/or drill bit guide, 24, is adapted to slide in slot, 26, formed along a diameter of rotatable member, 28, adapted to be rotatably disposed in circular hole, 29, in guide 12.

FIG. 1B is a schematic representation of an end view of rotatable member 28, showing first end plate, 30, having circular insert portion, 32, which has a diameter such that it may be received in circular hole 29 and a thickness equal to or slightly larger than the thickness of guide member 12, and second end plate 34, which is secured to first end plate 30 after the circular insert portion is disposed in hole 29. A slot formed along the diameter of first end plate 30 and circular insert portion 32 is aligned with a slot formed along the diameter of second end plate 34 to form combined slot 26 before rotatable member 28 is fastened together. Fastener holes, 36a and 36b, are shown for this purpose. Many fastening schemes are anticipated such as rivets or screws, as examples. End plates may be secured using adhesives. First marker and/or drill bit guide 24, may then be installed in slot 26. Rotatable member 28 may be rotated in hole 29.

FIG. 1C is a schematic representation of an end view another embodiment of rotatable member 28, illustrating first end plate 29, circular insert 32 and second end plate 34 as separate circular components each of which having a slot cut along a diameter. Before fastening the three member elements together to form rotatable member 28, the three slots are aligned. Again, first marker and/or drill bit guide 24 may then be installed in combined slot 26, and rotatable member 28 may be rotated in hole 29.

FIG. 1D is a schematic representation of one edge of the hole placement guide shown in FIG. 1A hereof, showing the alignment tabs thereof, 16a-16d and 38a-38d, alternately disposed perpendicular to opposite faces of guide plate 12.

Figure 2:
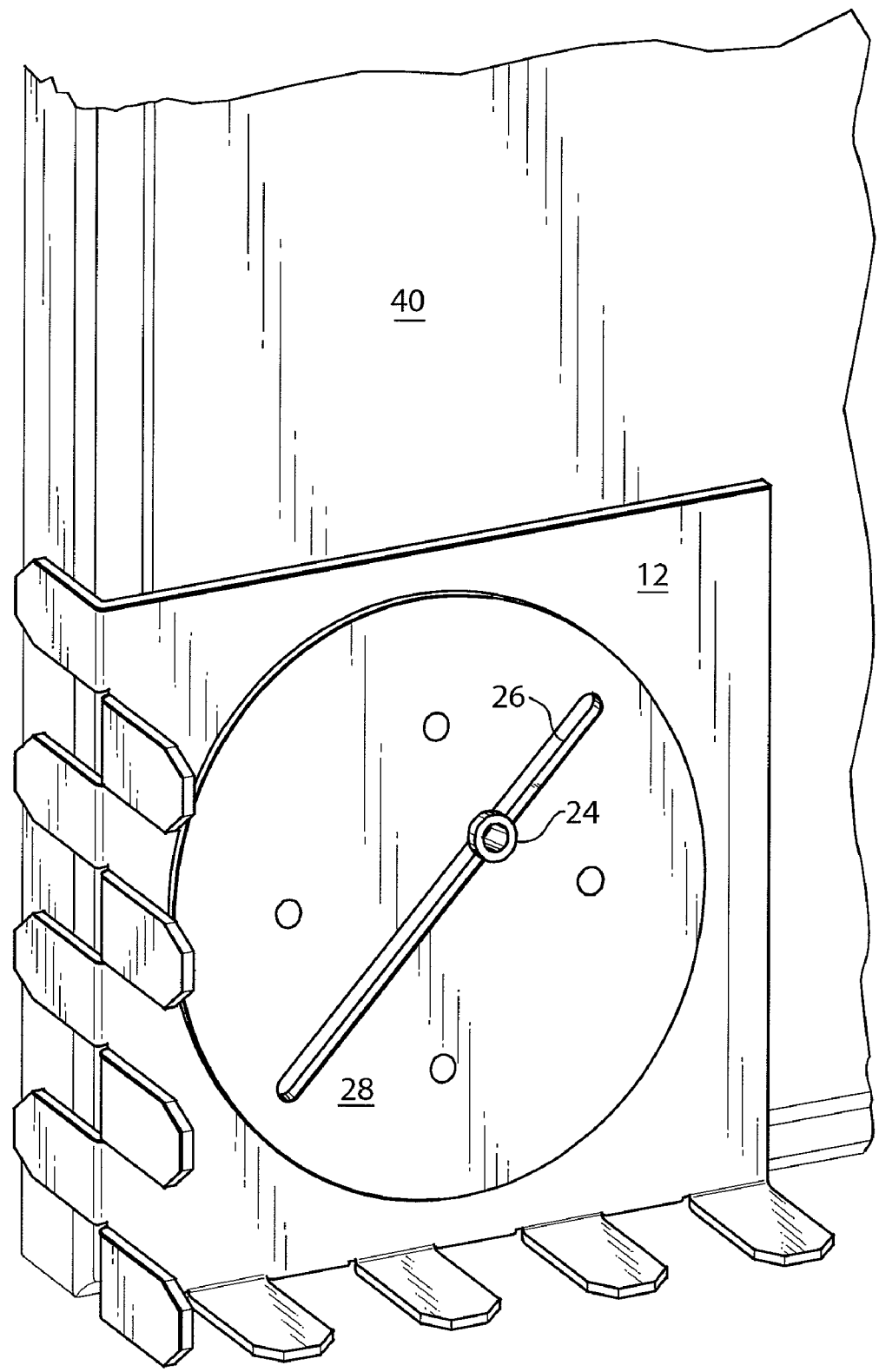
FIG. 2 is a schematic representation of an projection view of the hole placement guide shown in FIG. 1A hereof, disposed at the edge of a cabinet drawer or door for which a hole position is to be marked and/or drilled.

FIG. 2 is a schematic representation of an projection view of hole placement guide 10 shown in FIG. 1A hereof, disposed at the edge of cabinet drawer or door, 40, as an example, for which a hole position is to be marked and/or drilled. It may be observed that marker and/or drill guide 24 may be located at any point within the circle defined by slot 26 when disk 28 is rotated in plate 12.

Figure 3:
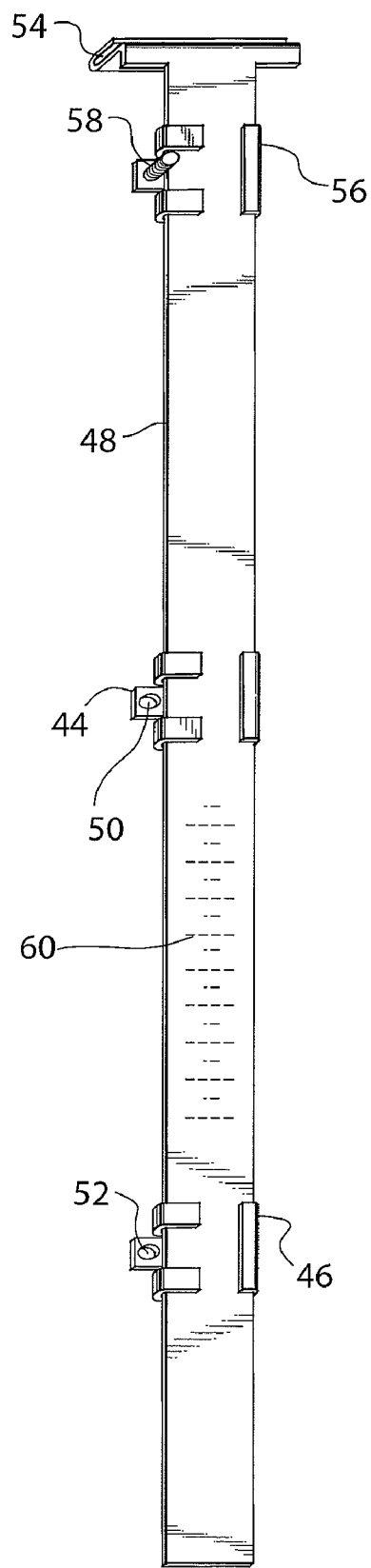
FIG. 3 is a schematic representation of a planar view of an embodiment of an extension member adapted to cooperate in many positions with the embodiment of the hole placement guide shown in FIG. 1A hereof.

FIG. 3 is a schematic representation of a planar view of an embodiment of extension member, 42, adapted to cooperate in many positions with the embodiment of hole placement guide 10 shown in FIG. 1A hereof. Slide members, 44, and 46, are adapted to be adjustably located along elongated portion, 48, such that with the aid of marker and/or drill guides, 50, and 52, respectively, drawer handle holes may be positioned. At one end of extension member 44, fold, 54, adapted to firmly fit over one or more of the tabs on guide plate 12 is formed. Slide member, 56, having post 58 adapted to fit into marker or drill guide 24 of guide plate 12 when used in cooperation with fold 54 and appropriate tabs, permits adjustable location of extension member 42 on guide plate 12, as may be viewed in FIG. 4 hereinbelow. Shown also in FIG. 3 are ruler markings, 60, impressed onto the outer surface of elongated portion 48.

Figure 4:
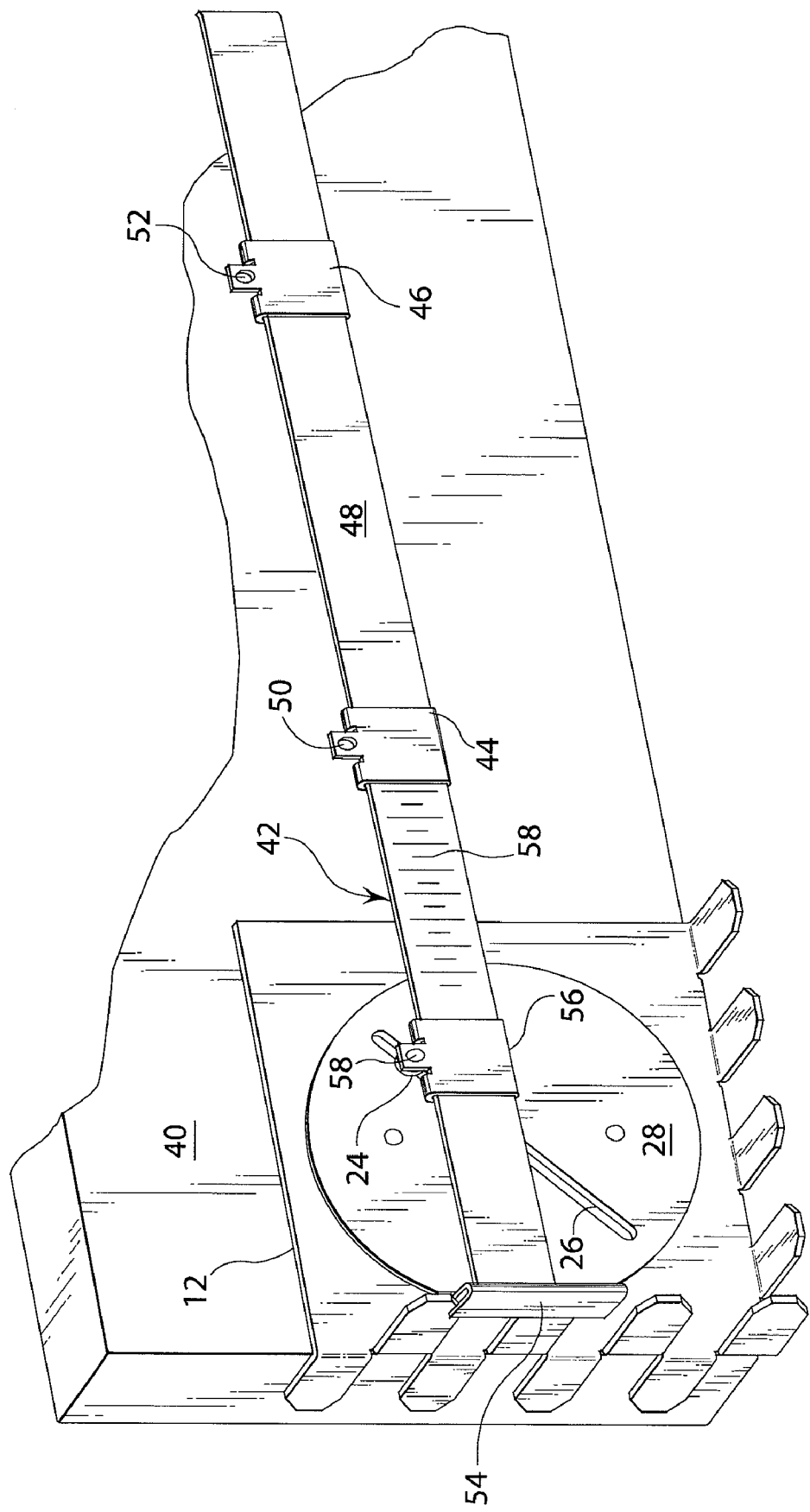
FIG. 4 is a schematic representation of a projection view of the extension member shown in FIG. 3 hereof attached to the embodiment of the hole placement guide shown in FIG. 1A hereof.

FIG. 4 is a schematic representation of a projection view of extension member 42 shown in FIG. 3 hereof adjustably attached to guide plate 12 shown in FIG. 1A hereof, the combination being located on a corner of cabinet drawer 40.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for marking and/or drilling hole locations in doors and drawers, comprising in combination:
    a planar guide member having two sides bounded in part by two adjacent straight edges forming a right angle at their meeting point and capable of engaging a corner of said door or drawer, said guide member having a circular hole therethrough having a chosen diameter;
    a circular insert adapted to be rotatably disposed in the hole in said guide, having a first circular end plate integrally formed therewith having a diameter larger than the circular hole in said guide, and having a first slot therethrough disposed along a diameter thereof;
    a second circular end plate having a diameter larger than the circular hole in said guide, and having a second slot therethrough disposed along a diameter thereof;
    means for securing said circular insert to said second circular end piece such that the first end plate of said circular insert is disposed on one side of said guide member, said second end plate is disposed on the other side thereof forming thereby a rotatable member, the first slot is aligned with the second slot forming a combined slot, and said rotatable member can rotate; and
    a first drill guide having a hole therethrough effective for accommodating a drill bit having a first selected diameter, and adapted to slidably move in the combined slot.

2. The apparatus of claim 1, wherein said planar guide member further comprises a plurality of tabs along the two adjacent straight edges alternatively directed perpendicularly to each side of said guide member, whereby said guide member can be reproducibly located at a corner of a drawer or door.

3. The apparatus of claim 2, further comprising an extension member having an elongated portion onto which at least one slide bearing a second drill guide having a hole therethrough effective for accommodating a drill bit having a second selected diameter is movably located, and a second slide bearing a post adapted to be received by said first drill guide and adapted to be movably located on said elongated portion of said extension member, said extension member being adapted to be adjustably attached to said guide member using a portion of said plurality of tabs, said first drill guide and said second slide, and disposed perpendicular to either of the adjacent straight edges, said elongated portion extending beyond the planar sides of said guide member.

4. An apparatus for marking and/or drilling hole locations in doors and drawers, comprising in combination:
    a planar guide member having two sides bounded in part by two adjacent straight edges forming a right angle at their meeting point and capable of engaging a corner of said door or drawer, said guide member having a circular hole therethrough having a chosen diameter;
    a circular insert adapted to be rotatably disposed in the hole in said guide and having a first slot therethrough along a diameter thereof;
    a first circular end plate having a diameter larger than the circular hole in said guide, and having a second slot therethrough disposed along a diameter thereof;
    a second circular end plate having a diameter larger than the circular hole in said guide, and having a third slot therethrough disposed along a diameter thereof;
    means for securing said circular insert to said first circular end piece and to said second circular end plate such that said first end plate is disposed on one side of said guide member and said second end plate is disposed on the other side thereof forming a combined insert, the first slot is aligned with the second slot and the second slot is aligned with the third slot, forming thereby a combined slot, and said combined insert can rotate; and
    a first drill guide having a hole therethrough effective for accommodating a drill bit having a first selected diameter, and adapted to slidably move in the combined slot.

5. The apparatus of claim 4, wherein said planar guide member further comprises a plurality of tabs along the two adjacent straight edges alternatively directed perpendicularly to each side of said guide member, whereby said guide member can be reproducibly located at a corner of a drawer or door.

6. The apparatus of claim 5, further comprising an extension member having an elongated portion onto which at least one slide bearing a second drill guide having a hole therethrough effective for accommodating a drill bit having a second selected diameter is movably located, and a second slide bearing a post adapted to be received by said first drill guide and adapted to be movably located on said elongated portion of said extension member, said extension member being adapted to be adjustably attached to said guide member using a portion of said plurality of tabs, said first drill guide and said second slide, and disposed perpendicular to either of the adjacent straight edges, said elongated portion extending beyond the planar sides of said guide member.

7. An apparatus for marking and/or drilling hole locations in cabinet doors and drawers, comprising in combination:
    a planar guide member having two sides bounded in part by two adjacent straight edges forming a right angle at their meeting point, and a plurality of tabs along the two adjacent straight edges alternatively directed perpendicularly to each side of said planar guide member, whereby said planar guide member is capable of reproducibly engaging a corner of a drawer or door, said guide member further having a circular hole therethrough having a chosen diameter;
    a circular insert adapted to be rotatably disposed in the hole in said guide and having a first slot therethrough along a diameter thereof;

a first circular end plate having a diameter larger than the circular hole in said guide, and having a second slot therethrough disposed along a diameter thereof;

a second circular end plate having a diameter larger than the circular hole in said guide, and having a third slot therethrough disposed along a diameter thereof;

means for securing said circular insert to said first circular end piece and to said second circular end plate such that said first end plate is disposed on one side of said guide member, said second end plate is disposed on the other side thereof forming thereby a combined insert, the first slot is aligned with the second slot and the second slot is aligned with the third slot forming thereby a combined slot, and said combined insert can rotate; a first drill guide having a hole therethrough effective for accommodating a drill bit having a first selected diameter, and adapted to slidably move in the combined slot; and an extension member having an elongated portion onto which at least one slide bearing a second drill guide having a hole therethrough effective for accommodating a drill bit having a second selected diameter is movably located, and a second slide bearing a post adapted to be received by said first drill guide and adapted to be movably located on said elongated portion of said extension member, said extension member being adapted to be adjustably attached to said guide member using said plurality of tabs, said first drill guide and said second slide, and disposed perpendicular to either of the adjacent straight edges, said elongated portion extending beyond the planar sides of said guide member.

* * * * *